(12) United States Patent
Liao

(10) Patent No.: US 11,895,075 B2
(45) Date of Patent: Feb. 6, 2024

(54) METHOD AND APPARATUS FOR DISPLAYING SHARED MAIL, AND ELECTRONIC DEVICE AND STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/938,776

(22) Filed: Oct. 7, 2022

(65) Prior Publication Data

US 2023/0037209 A1 Feb. 2, 2023

Related U.S. Application Data

(63) Continuation of application No. PCT/CN2021/085585, filed on Apr. 6, 2021.

(30) Foreign Application Priority Data

Apr. 30, 2020 (CN) .......................... 202010368148.6

(51) Int. Cl.
  *G06F 15/16* (2006.01)
  *H04L 51/42* (2022.01)
  *G06Q 10/107* (2023.01)
(52) U.S. Cl.
  CPC .......... *H04L 51/42* (2022.05); *G06Q 10/107* (2013.01)

(58) Field of Classification Search
  CPC .............................. H04L 51/42; G06Q 10/107
  (Continued)

(56) References Cited

U.S. PATENT DOCUMENTS

| 10,963,842 B1 * | 3/2021 | Resheff ................. G06F 16/906 |
| 2002/0099777 A1 * | 7/2002 | Gupta .................. G06Q 10/107 |
| | | 709/206 |

(Continued)

FOREIGN PATENT DOCUMENTS

| CN | 102318294 A | 1/2012 |
| CN | 103903124 A | 7/2014 |

(Continued)

OTHER PUBLICATIONS

Tilford, Matt. "Hide empty folders". p. 1. (Year: 2010).*

(Continued)

*Primary Examiner* — Imad Hussain
(74) *Attorney, Agent, or Firm* — Faegre Drinker Biddle & Reath LLP

(57) ABSTRACT

A method and apparatus for displaying mail for share, and an electronic device and a storage medium are provided. The method includes: in response to the detection of a mail sharing operation, determining mail for share in a current mailbox; and displaying the mail for share in a preset display manner, wherein the preset display manner is different from a display manner of non-shared mail in the current mailbox. By means of the technical solution, mail for share and non-shared mail in a mailbox can be effectively distinguished from one another, thereby improving the user experience.

19 Claims, 5 Drawing Sheets

A mail for share in a mailbox is determined in response to detecting a mail sharing operation —S110

The mail for share is displayed in a preset display manner, where the preset display manner is different from a display manner for a non-shared mail in the current mailbox —S120

(58) Field of Classification Search
USPC .................................................. 709/204, 206
See application file for complete search history.

(56) References Cited

U.S. PATENT DOCUMENTS

| | | | |
|---|---|---|---|
| 2011/0289581 A1* | 11/2011 | Gourevitch | H04L 63/126 709/206 |
| 2011/0314384 A1 | 12/2011 | Lindgren et al. | |
| 2013/0151633 A1 | 6/2013 | Hazarika | |
| 2018/0270247 A1 | 9/2018 | Wada | |
| 2020/0026688 A1 | 1/2020 | Yung et al. | |
| 2020/0328998 A1* | 10/2020 | Rajagopal | G06Q 10/107 |

FOREIGN PATENT DOCUMENTS

| | | |
|---|---|---|
| CN | 104219134 A | 12/2014 |
| CN | 106156105 A | 11/2016 |
| CN | 108011968 A | 5/2018 |
| CN | 108306810 A | 7/2018 |
| CN | 108667895 A | 10/2018 |

OTHER PUBLICATIONS

Cunningham, Paul. "Office 365 Groups vs. Shared Mailboxes". Nov. 6, 2017. pp. 1-16. (Year: 2017).*
Second Office Action dated Oct. 17, 2022 in Chinese Patent Application No. 202010368148.6 with English translation (13 pages).
Mobile QQ mailbox how to share the text of the e-mail with others, Zhexueguairen, Baidu experience <https://jingyan.baidu.com/article/2c8c281d9297720008252a9f.html> Aug. 31, 2018, with concise explanation of relevance (4 pages).
Search Report dated Jun. 24, 2021 for PCT Application No. PCT/CN2021/085585 with English translation (11 pages).
First Office Action dated Mar. 28, 2022 for CN Application No. 202010368148.6 with English translation (10 pages).

* cited by examiner

| | Search bar | 🔎 ... |
|---|---|---|
| Inbox | All▼ | 123aaabbb |
| Outbox | ★ Zhang San,Li Si  18:14<br>123aaabbb  [2] | Sender:Zhang San<zhangsan@xxx.com>◆Time:January 13, 2020, 18:14 [Forward] [Reply]<br>Recipient:Li Si<lisi@xxx.com>,Me<br>Hello |
| Draft box | Wang San  1-5<br>12222222  [3] | |
| Deleted mails | | |
| Spam mails | Wang Si  1-3<br>2222222<br>X Brief information of mail content X | Sender:Li Si<lisi@xxx.com>◆    Time:January 12, 2020, 11:12 [Forward] [Reply]<br>Recipient:Zhang San<zhangsan@xxx.com>, Me<br>X Brief information of mail content X |
| | Wang Wu  1-1<br>2222222<br>X Brief information of mail content X | |

Figure 5

```
┌─────────────────────────────────────────────────────────────┐
│ A mail for share in a current mailbox is determined in      │ ─── S310
│ response to detecting a mail sharing operation              │
└─────────────────────────────────────────────────────────────┘
                              ↓
┌─────────────────────────────────────────────────────────────┐
│ The mail for share is added to a sharing box for displaying │ ─── S320
└─────────────────────────────────────────────────────────────┘
```

Figure 6

Mail group list in an inbox

| | Search bar | 123aaabbb |
|---|---|---|
| Inbox | All▾ | |
| Outbox | Zhang San,Li Si 18:14<br>123aaabbb [2] | Sender:Zhang San<zhangsan@xxx.com>  Time:January 13, 2020, 18:14 [Forward][Reply]<br>Recipient:Li Si<lisi@xxx.com>,Me |
| Draft box | Wang San 1-5<br>12222222 [3] | Hello |
| Deleted mails | | |
| Spam mails | Wang Si 1-3<br>2222222<br>X Brief information of mail content X | Sender:Li Si<lisi@xxx.com>  Time:January 12, 2020, 11:12 [Forward][Reply]<br>Recipient:Zhang San<zhangsan@xxx.com>,Me<br>X Brief information of mail content X |
| | Wang Wu 1-1<br>2222222<br>X Brief information of mail content X | |

Figure 7

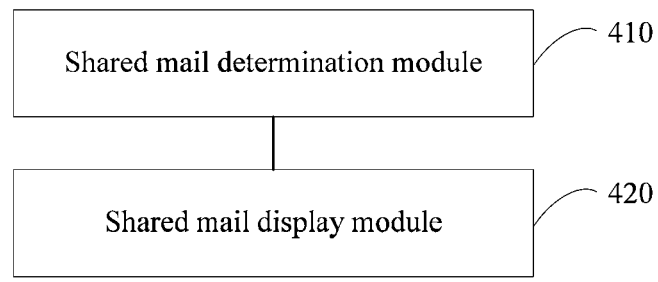

Figure 8

METHOD AND APPARATUS FOR DISPLAYING SHARED MAIL, AND ELECTRONIC DEVICE AND STORAGE MEDIUM

The present disclosure is a continuation of International Application No. PCT/CN2021/085585, filed on Apr. 6, 2021 which claims priority to Chinese Patent Application No. 202010368148.6, titled "METHOD AND APPARATUS FOR DISPLAYING SHARED MAIL, AND ELECTRONIC DEVICE AND STORAGE MEDIUM", filed with the China National Intellectual Property Administration on Apr. 30, 2020, both of which are incorporated herein by reference in their entireties.

FIELD

The embodiments of the present disclosure relate to computer technology, and in particular, to a method and an apparatus for displaying a mail for share, an electronic device and a storage medium.

BACKGROUND

With the rapid development of computer technology and the increasing demands of users, it is generally necessary for a user to share a mail to other users, resulting in that mails obtained by the user sharing exists in mailboxes of other users.

SUMMARY

A method and an apparatus for displaying a mail for share, an electronic device and a storage medium are provided according to the embodiments of the present disclosure, to effectively distinguish mails for share from non-shared mails in the mailbox, thereby improving user experience.

In a first aspect, a method for displaying a mail for share is provided according to an embodiment of the present disclosure. The method includes:
  determining a mail for share in a mailbox, in response to detecting a mail sharing operation;
  displaying the mail for share in a preset display manner, where the preset display manner is different from a display manner for a non-shared mail in the mailbox.

In a second aspect, an apparatus for displaying a mail for share is further provided according to an embodiment of the present disclosure. The apparatus includes a shared mail determination module and a shared mail display module.

The shared mail determination module is configured to determine a mail for share in a mailbox, in response to detecting a mail sharing operation;

The shared mail display module is configured to display the mail for share in a preset display manner, where the preset display manner is different from a display manner for a non-shared mail in the mailbox.

In a third aspect, an electronic device is further provided according to an embodiment of the present disclosure. The electronic device includes: one or more processors; a memory configured to store one or more programs. The one or more programs, when executed by the one or more processors, cause the one or more processors to implement the method for displaying a mail for share according to any one of the embodiments of the present disclosure.

In a fourth aspect, a computer readable storage medium is further provided according to an embodiment of the present disclosure. The computer readable storage medium stores a computer program, where the computer program, when executed by a processor, implements the method for displaying a mail for share according to any one of the embodiments of the present disclosure.

With the technical solutions according to the embodiments of the present disclosure, a mail for share in a current mailbox may be determined in response to detecting a mail sharing operation, and the mail for share is displayed in a preset display manner, such that the display manner for mails for share is different from that for non-shared mails in the mailbox. Therefore, mails for share and non-shared mails in the mailbox may be effectively distinguished in different display manners. In this way, the users can rapidly know the mails for share in the mailbox, thereby improving user experience.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

FIG. 5 illustrates an example of displaying a preset sharing identification according to a second embodiment of the present disclosure;

FIG. 6 illustrates a schematic flowchart of a method for displaying a mail for share according to a third embodiment of the present disclosure;

FIG. 7 illustrates an example of storing a mail for share with a sharing box according to a third embodiment of the present disclosure;

FIG. 8 illustrates a schematic structural diagram of an apparatus for displaying a mail for share according to a fourth embodiment of the present disclosure.

DETAILED DESCRIPTION OF EMBODIMENTS

Figure 1:
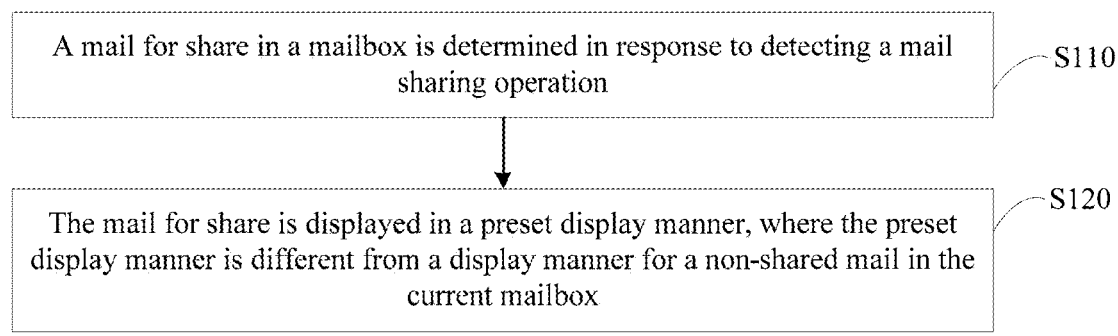
FIG. 1 illustrates a schematic flowchart of a method for displaying a mail for share according to a first embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The term "include" and variations thereof in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different apparatuses, modules or units, and are not used to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

The applicant of the present disclosure found in the process of implementing the present disclosure that a user may share mails to other users, such that the mails obtained by the user sharing exist in mailboxes of other users. In one embodiment, after the mails are shared, there is no sharing trace in the mails for share, such that the user cannot distinguish the mails for share from other non-shared mails in the mailbox, thereby reducing the user experience. In view of this, in some embodiments of the present disclosure, a mail for share in a mailbox may be determined in response to detecting a mail sharing operation, and the mail for share is displayed in a preset display manner, such that the display manner for mails for share is different from the display manner for non-shared mails in the mailbox. Therefore, mails for share and non-shared mails in the mailbox may be effectively distinguished in different display manners. In this way, the users can rapidly know the mails for share in the mailbox, thereby improving user experience.

First Embodiment

FIG. 1 illustrates a schematic flowchart of a method for displaying a mail for share according to a first embodiment of the present disclosure. This embodiment may be applied to a case in which a mail for share in a mailbox is displayed. The method may be performed by an apparatus for displaying a mail for share. The apparatus may be implemented in software and/or hardware, and integrated into an email client of a sharer or an email client of a sharee. The email client may be integrated in a PC (Personal Computer) end or a mobile terminal. As shown in FIG. 1, the method includes steps S110 and S120.

In S110, a mail for share in a mailbox is determined in response to detecting a mail sharing operation.

The mail sharing operation may refer to an operation triggered by the sharer, which is used for sharing a mail in a current mailbox of a sharer to a sharee. The mail for share may refer to a mail shared by the sharer at this time, which may be one or more mails.

In an embodiment, the email client of the sharer may share a to-be-shared mail to the sharee in response to detecting a mail sharing operation, such that an IM client and/or an email client of the sharee may obtain the mail for share that is shared by the sharer. The IM client and the email client may be different clients. Alternatively, the IM client and the email client may be functional modules with interactive capability under the same client, such that the email client and the IM client may communicate more conveniently. If the sharer only shares the mail to the IM client of the sharee and not to the email client of the sharee, that is, the mail for share does not exist in the email client of the sharee, the technical solution of this embodiment only applied to the email client of the sharer. If the sharer shares the mail to the email client of the sharee, that is, the mail for share exists in the email client of the sharee, the technical solution of this embodiment may be applied to the email client of the sharer. That is, the email client of the sharer may determine the mail for share actively shared in the mailbox in response to detecting the mail sharing operation. In addition, the technical solution of this embodiment may also be applied to the email client of the share. That is, the email client of the sharee may determine a mail for share which is shared by the sharer and received in the current mailbox, in response to detecting the mail sharing operation. In the email client of the sharer and the email client of the share, the mail for share may be displayed in the same manner.

Mail sharing refers to an operation performed by a sharer to enable a sharee to view the mail. For example, the sharer may assign to the sharee a viewing permission for the mail, or the sharer may send the mail to the sharee in a form of a snapshot. It should be noted that the mail sharing in the embodiment of the present disclosure differs from conventional mail forwarding in that the mail sharing does not change the participants of the mail, while the mail forwarding changes the participants of the mail. For example, the mail sharing will not change the original sender, recipient, and carbon copy party of the mails, while the mail forwarding may change the original sender of the mail to the forwarder.

In the case that the technical solution of this embodiment is applied to the email client of the sharer, S110 may include: determining a current to-be-shared target mail, in response to detecting a mail sharing operation triggered by a sharer; and sharing, based on sharee information, the target mail to a sharee corresponding to the sharee information, such that a client corresponding to the sharee obtains the target mail; and determining the target mail as the mail for share in the mailbox.

The sharee information may include: at least one piece of user information and/or at least one piece of user group information. The user information may include, but be not limited to, a user account name. The user group information may include, but be not limited to, a user group name. The sharee corresponding to the sharee information may include at least one single user, and/or users in at least one user group. The sharee information may include share IM information, such that the target mail may be shared to the IM client corresponding to the sharee. The sharee information may also include sharee email information, such that the target mail may be shared to an email client corresponding to the sharer. The target mail may refer to at least one mail to be shared currently.

Figure 2:
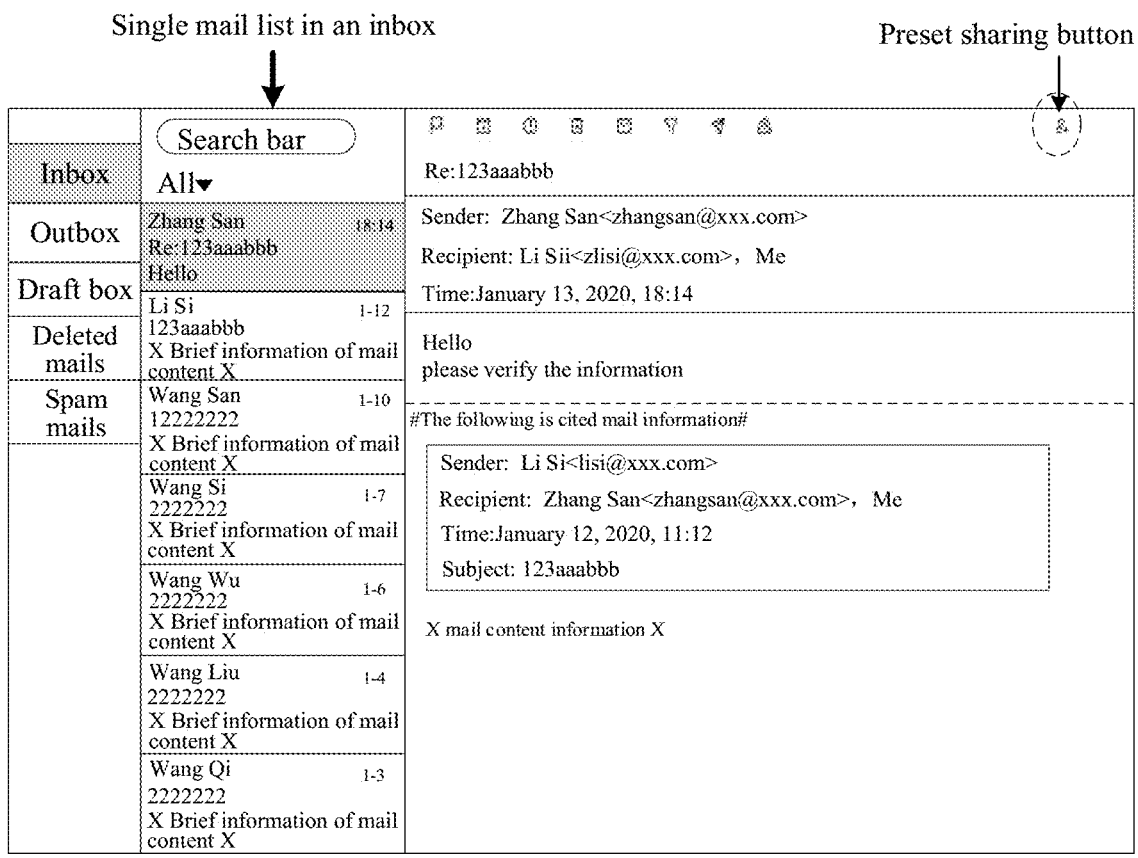
FIG. 2 illustrates an example of displaying a mailbox interface according to a first embodiment of the present disclosure.
Figure 3:
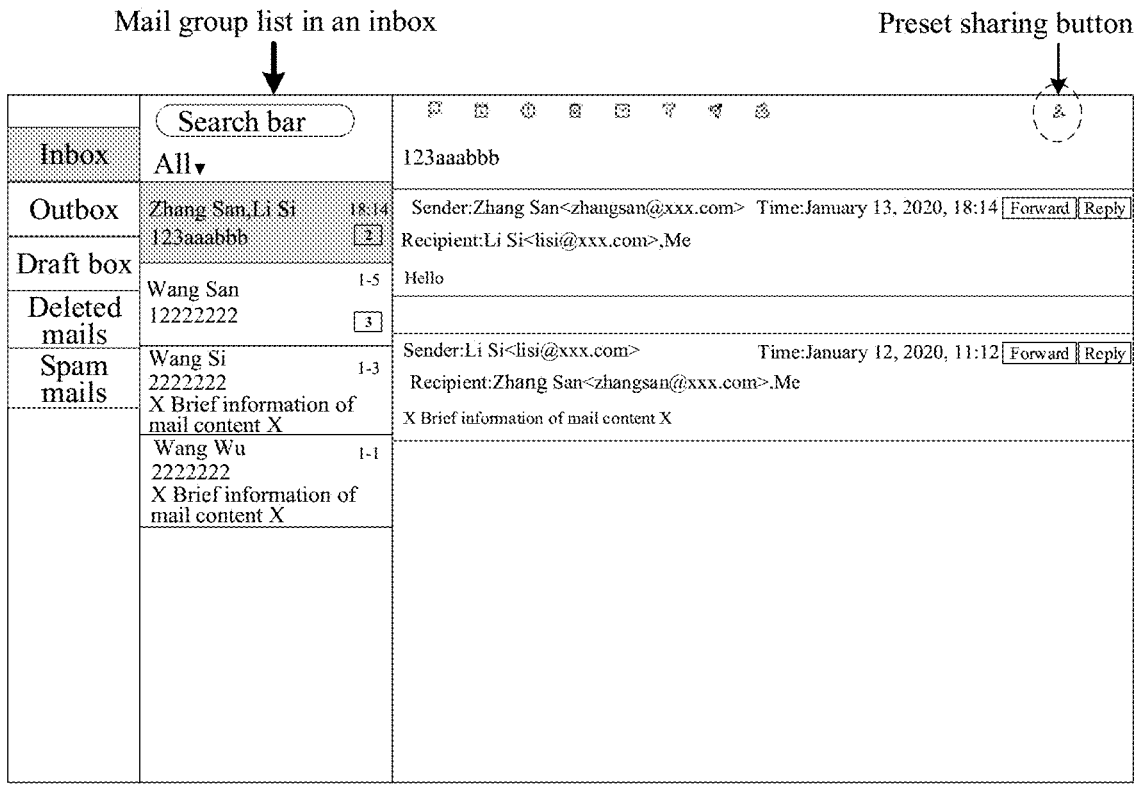
FIG. 3 illustrates another example of displaying a mailbox interface according to a first embodiment of the present disclosure.

In an embodiment, the email client of the sharer may determine the current to-be-shared target mail based on the mail sharing operation triggered by the sharer. For example, if the mail is stored separately in a form of a single mail in the mailbox, a preset sharing button may be set on a mail display interface of each mail in the mailbox. For example, as shown in FIG. 2, the preset sharing button (in the dotted circle in FIG. 2) is set on a mail display interface of the first mail in the single mail list in the inbox, such that an mail sharing operation may for this mail be triggered based on the preset sharing button. If the mail is classified and stored in a form of mail group, a preset sharing button may be set on the display interface of each mail group. For example, as shown in FIG. 3, the preset sharing button (in the dotted circle in FIG. 3) is set on a display interface of the first mail group in the mail group list in the inbox, such that an mail sharing operation for this mail group may be triggered based on the preset sharing button. A preset sharing button may also be set on the mail display interface of each mail contained in the mail group, such that the mail sharing operation may be triggered for each mail in the mail group based on the preset sharing button. Each mail group in the mailbox may be configured to store matching mails, so as to realize the classification storage of the mail. For example, mails with the same subject information and recipient information may be stored in the same mail group; or mails with the same subject information and specific reference relationship may also be stored in the same mail group.

Exemplarily, the first mail may be directly determined as the target mail, in response to detecting the mail sharing operation triggered by the sharer, where the mail sharing operation is triggered by means of performing a click operation on the preset sharing button on the mail display interface of the first mail. If the mail is stored separately in a form of a single mail in the mailbox, the mail information on the first mail may be matched with mail information on existing mails in the mailbox, to determine a second mail that matches with the first mail; and determine the current to-be-shared target mail from the second mail. Alternatively, if the mail is classified and stored in a form of mail group, each mail in the mail group including the first mail is determined as the second mail that matches with the first mail, and current to-be-shared target mail is determined from the second mails. For example, the matching second mails may be directly determined as the target mails. The second mails may be displayed on the display interface, such that the sharer may select the mail to be shared based on own needs. Thus, the current to-be-shared target mail may be obtained based on a selection operation of the user, and thus improving the flexibility of mail sharing and satisfying the personalized needs of users. The first mail may include: a mail in an edit state, a received mail in an inbox, a sent mail in outbox, or an edited mail stored in a draft box. The mail in the edit state may refer to a new editable mail generated by the sharer by triggering the mail writing operation. The second mail may include the first mail and/or other mails.

Exemplarily, mails in the first mail group may be directly determined as target mails, in response to detecting the mail sharing operation triggered by the sharer, where the mail sharing operation is triggered by means of performing a click operation on the preset sharing button on the mail display interface for the first mail group. The mails in the first mail group may also be displayed on the display interface. The sharer may select the mail to be shared based on own needs, thereby obtaining the current to-be-shared target mails based on selection operations of users, and thus improving the flexibility of sharing mails.

In an embodiment, the email client of the sharer may display a display interface for obtaining sharee information, in response to detecting the mail sharing operation triggered by the sharer. The sharer may manually input the sharee information on the display interface or select the required sharee information from the displayed sharee information to be selected, thereby obtaining the sharee information based on the input operation or selection operation of the user. Based on the sharee information, the target mail may be shared to a sharee corresponding to the sharee information, to display the target mail on a client corresponding to the sharee. For example, based on the sharee IM information, the target mail is shared to a sharee corresponding to the sharee IM information. In this way, the target mail is associatively displayed on the IM client interface of the sharee. For example, the target mail may be directly displayed on the IM client interface of the share. Alternatively, sharing prompt information on the target mail may also be displayed on the IM client interface of the sharee, and the target mail may be displayed on the email client interface of the sharee, such that the sharee accesses the email client of the sharee based on the mail sharing prompt information to view the target mail. In this way, mail sharing from the mailbox end to the IM end is realized. For another example, based on sharee email information, the target mail is shared to a sharee corresponding to the sharee email information to display the target mail on the email client interface of the share. In this way, mail sharing from the mailbox end to the mailbox end is realized. When the sharer needs to share multiple matching target mails, the matching target mails can be shared to the sharee in one single time, avoiding the need for sharing mail many times, simplifying the mail sharing operation and improving the mail sharing efficiency. After sharing the target mail, the email client of the sharer may determine the target mail as a mail for share in the current mailbox of the sharer.

In a case that the technical solution of this embodiment is applied to the email client of the sharee, S110 may include: receiving a target mail, where the target mail is shared by an email client of a sharer in response to a mail sharing operation triggered by the sharer; and determining the received target mail as a mail for share in the mailbox.

In an embodiment, the detailed process of sharing the target mail by the email client of the sharer in response to the mail sharing operation triggered by the sharer may refer to the above description. If the email client of the sharer shares the target mail to the email client of the sharee, the email client of the sharee may receive the target mail shared by the sharer and determine the received target mail as a mail for share in the current mailbox of the sharee. The email client of the sharee in this embodiment may store the received mail for share in the inbox of the mailbox.

It should be noted that the target mail shared by the sharer through the mail sharing operation may be controlled by the sharer. In an embodiment, operation permission of the sharee for the target mail obtained by sharing of the sharer is a temporal permission. The temporary permission of the sharee for the target mail is limited by an operation triggered by the sharer. For example, in response to a sharing end operation triggered by the sharer, the target mail becomes invisible for the sharee. If the target mail is a received mail or a sent mail in the mailbox of the sharer, the sharer does not modify content of the target mail when sharing the target mail. That is, the receiving end may display at least a part of the target mail determined based on the temporary permission as the target mail, regardless a type of the temporary permission assigned to the sharee by the sharer. The sharer may set different mail processing permissions for different receivers. Compared with forwarding a mail, the mail forwarded by a mail forwarding operation is a mail which has been received by a forwarder. Thus, the forwarded mail is not controlled by the forwarder. In addition, content of a mail to be forwarded in the mailbox can be modified, and different receivers of the forwarded mail have the same mail processing permission. Thus, the mail sharing operation differs from the existing mail forwarding operation.

In S120, the mail for share is displayed in a preset display manner, where the preset display manner is different from a display manner for a non-shared mail in the current mailbox.

The non-shared mail may refer to a mail obtained by the normal sending and receiving manners in the current mailbox, rather than the sharing manner, such as a mail sent by adding a recipient. The preset display manner may be preset to display the received mail for share or the actively mail for share based on business requirements, which is different from the display manner for the non-shared mail.

In an embodiment, the mail for share may be displayed by using a preset display manner different from the display manner for the non-shared mail. Therefore, the mail for share and the non-shared mail in the mailbox may be effectively distinguished based on different display manners, such that users can rapidly know the mail for share in the mailbox, thereby improving user experience. Exemplarily, the mail for share and the non-shared mail may be distinguished by using different mail background colors. For example, the mail background color for the non-shared mail in the current mailbox is displayed as white; and the mail background color for the mail for share is displayed as colored. In this way, the mail for share and the non-shared mail in the current mailbox may be intuitively distinguished based on different background colors, thereby improving user experience.

With the technical solutions according to the embodiments of the present disclosure, a mail for share in a current mailbox may be determined in response to detecting a mail sharing operation, and the mail for share is displayed in a preset display manner, to display the mail for share in different display manner from the non-shared mail in the mailbox. Therefore, mails for share and non-shared mails in the mailbox may be effectively distinguished in different display manners, such that users can rapidly know the mails for share in the mailbox, thereby improving user experience.

On the basis of the above-mentioned technical solutions, in the case that the technical solution of this embodiment is applied to the email client of the sharee, after the email client of the sharer receives the target mail shared by the email client of a sharer based on a mail sharing operation triggered by the sharer, the method may further include: shielding a mail receiving entrance of a spam box to prevent the spam box from receiving the target mail.

The spam box may be a storage container configured to store spam emails in the mailbox. The spam email may refer to an email that is forcibly sent to a mailbox of a user without user permission.

In an embodiment, in the case that the email client of the sharee receives a mail for share shared by the sharer, the mail receiving entrance of the spam box may be shielded, so as to avoid the mail for share being processed as a spam. Thus, the sharee may normally receive the mail for share. It should be noted that the sharer may share a mail to the sharee without the permission of the sharee, thereby avoiding the limitation of mail sharing and improving the applicability of mail sharing scenarios.

On the basis of the above-mentioned technical solutions, in the case that the technical solution of this embodiment is applied to the email client of the sharer, the method may further include: displaying a sharing success prompt identification at a preset position of a target cell in a target mail list containing the mail for share, where the target cell is configured to display abbreviative information on the mail for share; and in response to detecting an mail viewing operation triggered by a current user for the mail for share, deleting the displayed sharing success prompt identification.

The abbreviative information on the mail for share may include, but be not limited to: at least one of a recipient, a sender, subject information and text summary information of the target mail. Each cell in the target mail list may be used to display abbreviative information on the mail for share or abbreviative information on the non-shared mail, such as a single mail list in FIG. 2. Alternatively each cell in the target mail list may also be used to display abbreviative information on a mail group containing the mail for share or abbreviative information on a mail group containing the non-shared mail, such as a mail group list in FIG. 3. The sharing success prompt identification may be an identification used to prompt the user that the target mail is successfully shared. The sharing success prompt identification may be represented by means of special symbols or graphics. The preset position of the target cell may refer to any blank position in the target cell. For example, a blank position on the left side of the recipient or the sender displayed in the cell may be used as a preset position to display the sharing success prompt identification.

In an embodiment, the email client of the sharer displays the sharing success prompt identification at the preset position of the target cell to prompt the sharer that the mail is successfully shared. In this case, the mail for share is equivalent to being in an unread state. If the sharer clicks on the cell in which the sharing success prompt identification is displayed, the email client of the sharer may detect the mail viewing operation triggered by the sharer, which indicates that the sharer has viewed the current shared mail and is informed that the mail has been shared successfully. That is, the mail for share is equivalent to being in a read state. In this case, the displayed sharing success prompt identification may be deleted, such that the display interface is more concise.

Second Embodiment

Figure 4:
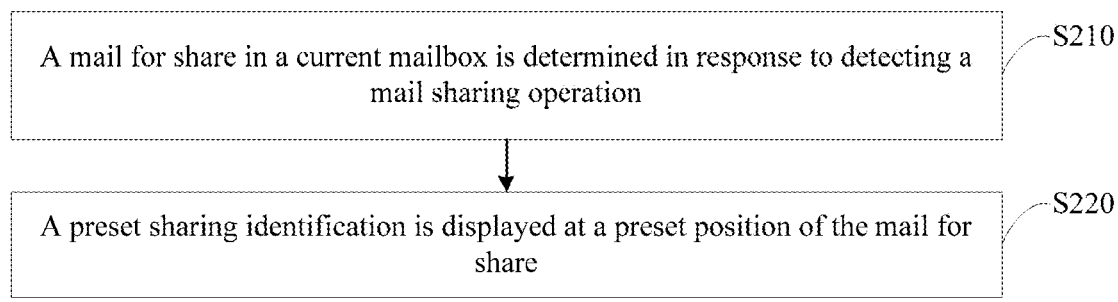
FIG. 4 illustrates a schematic flowchart of a method for displaying a mail for share according to a second embodiment of the present disclosure.

FIG. 4 illustrates a schematic flowchart of a method for displaying a mail for share according to a second embodiment of the present disclosure. This embodiment may be combined with the above-mentioned embodiments, and a method for displaying a mail for share by using a preset sharing identification is described in detail. The explanations of terms that are the same as or corresponding to the above-mentioned embodiments are not repeated here.

Referring to FIG. 4, the method for displaying a mail for share according to this embodiment specifically includes steps S210 and S220.

In S210, a mail for share in a current mailbox is determined in response to detecting a mail sharing operation.

In S220, a preset sharing identification is displayed at a preset position of the mail for share.

The preset sharing identification may refer to an identification used to prompt that the mail is the mail for share. The preset sharing identification may be represented by means of special symbols or graphics. The preset location of the mail for share may be any blank location in the mail for share.

In an embodiment, after sharing the mail, the email client of the sharer may display the preset sharing identification at the preset position of the mail for share. Thus, the sharer may determine whether the mail is the mail for share or the non-shared mail based on whether the preset sharing identification is displayed. Correspondingly, when receiving the mail for share from the sharer, the email client of the sharee may display the preset sharing identification at the preset position of the received mail for share. Thus, the sharee may determine whether the mail is the mail for share or the non-shared mail based on whether the preset sharing identification is displayed.

With technical solution according to the embodiment of the present disclosure, the mail for share and the non-shared mail in the current mailbox may be effectively distinguished based on whether the preset sharing identification is displayed at the preset position of the mail for share, such that users can rapidly know the mail for share in the mailbox, thereby improving user experience.

On the basis of above-mentioned technical solutions, S220 may include: displaying a preset sharing identification at a preset position of a first cell in an existing mail list containing the mail for share, where the first cell is used to display abbreviative information on the mail for share; and/or displaying a preset sharing identification at a preset position on a mail display interface of the mail for share.

The abbreviative information on the mail for share may include, but be not limited to: at least one of a recipient, a sender, subject information and text summary information of the target mail. Each cell in the existing mail list may be configured to display abbreviative information on a mail for share or abbreviative information on a non-shared mail, such as a single mail list in FIG. 2. Alternatively, each cell in the target mail list may be configured to display abbreviative information on a mail group containing the mail for share or abbreviative information on a mail group containing the non-shared mail, such as a mail group list in FIG. 3.

Exemplarily, FIG. 5 illustrates an example of displaying a preset sharing identification. As shown in FIG. 5, mails are classified and stored in a form of mail group. Two mails corresponding to a first mail group in a mail group list of the inbox are mails actively shared by the sharer, or are mails which are received by the sharee and are shared by the sharer. In this case, a preset sharing identification (such as a five-pointed star identification in FIG. 5) may be displayed at a preset position of a cell where the mail group is located in the mail group list, such as a blank position at a left side of the sender. Alternatively, the preset sharing identification (such as a black dot identification in FIG. 5) may be displayed at a preset position on the mail display interface of the mail for share, such as a top position of the mail display interface. Thus, when all mails in the mail group are the mails for share, it is easier to identify the mails for share by displaying the preset sharing identification at the top position. In addition, the preset sharing identification (such as a diamond-shaped identification in FIG. 5) may also be displayed on an information display interface of each mail for share. Thus, when not all mails in the mail group are the mails for share, it is ensured that the user may accurately identify the mails for share in the mail group, thereby further ensuring the accuracy of distinguishing mails.

Exemplarily, since user identity of each user may be switched from a sharer to a sharee, and may also be switched from a sharee to a sharer, both the mails for share actively shared and the received mails shared by other users may exist in the mailbox of the same user. In view of this, the preset sharing identification may include a first sharing identification and a second sharing identification, such that the two types of mails mentioned above in the mailbox may be distinguished by using different sharing identifications. For example, S220 may include: in response to the mail for share being a mail actively shared by a current user, displaying a first sharing identification at a preset position of a second cell in the mail for share; or in response to the mail for share being a received mail shared by other users, displaying a second sharing identification at a preset position of a second cell in the mail for share. The second cell may be used to display abbreviative information on the mail for share, or to display other information. In this way, the first sharing identification may be used to indicate that the mail for share is a mail shared by the current user, and the second sharing identification may be used to indicate that the mail for share is shared by other users. In this way, a mail for share obtained by actively sharing and a received mail for share may be more clearly and more intuitive distinguished, thereby further improving user viewing experience.

On the basis of the above-mentioned technical solutions, after S220, the method may further include: in response to detecting a shared mail deletion instruction, deleting a preset sharing identification displayed at the preset position of the mail for share corresponding to the shared mail deletion instruction, where the shared mail deletion instruction is generated based on a sharing stop operation triggered by the sharer for at least one sharee.

In an embodiment, the sharer may trigger the sharing stop operation for all shares. The clients of all sharees may receive the shared mail deletion instruction. Alternatively, the sharer may trigger the sharing stop operation for a part of sharees. The part of sharees may receive the shared mail deletion instruction. For example, in the email client of the sharer, a stop button may be set on the display interface of the mail for share to control stop of sharing. If the sharer does not want to continue sharing mails, the sharer may perform click on the stop button to select at least one sharee for which sharing needs to be stopped, so as to stop the mail sharing for the selected sharee. If detecting that the sharer has triggered the sharing stop operation for at least one sharee, the email client of the sharer generates the shared mail deletion instruction based on the mail to be currently stopped sharing, and sends the shared mail deletion instruction to the email clients of the targeted sharees, to delete the mails for share received by respective sharees. The email client of the sharee may, based on the shared mail deletion instruction, delete the preset sharing identification displayed at the preset position of the mail for share corresponding to the shared mail deletion instruction. In this way, the sharer may control the mails for share in real time, which further meets user requirements. If detecting that the sharer has triggered the sharing stop operation for all sharees, the email client of the sharer may, based on the shared mail deletion instruction, delete the preset sharing identification displayed at the preset position of the mail for share in the email client of the sharer, such that the sharing status of the mail may be cancelled. Therefore, the mail for share is converted into a non-shared mail, such that the sharer can more intuitively know target mails that are currently shared, thereby further improving the user viewing experience.

Exemplarily, the operation of deleting a preset sharing identification displayed at the preset position of the mail for share corresponding to the shared mail deletion instruction may include: in the case that the mail for share corresponding to the shared mail deletion instruction is a mail actively shared by a current user, deleting the preset sharing identification displayed at the preset position of the mail for share corresponding to the shared mail deletion instruction; or in the case that the mail for share corresponding to the shared mail deletion instruction is a received mail shared by other users, deleting the mail for share corresponding to the shared mail deletion instruction and the displayed preset sharing identification.

In an embodiment, in the email client of the sharer, since the mail for share is a real user mail in the mailbox, only the preset sharing identification displayed at the preset position of the mail for share corresponding to the shared mail deletion instruction needs to be deleted. In this way, the mail for share is converted into a non-shared mail, but is still stored in the mailbox of the sharer. In the email client of the sharee, since the mail for share is obtained by other users sharing, not a real mail obtained in the normal sending and receiving manners, the email client of the sharee needs to delete the mail for share corresponding to the shared mail deletion instruction and the displayed preset sharing identification, so as to realize the effective control of the mail for share.

It should be noted that, when the sharee is a sender and receiver in the mail for share, the same non-shared mail as the mail for share may pre-exist in the mailbox of the share. Thus, only the corresponding mail for share is deleted based on the shared mail deletion instruction, and the same non-shared mails as mails for share are not deleted, thereby further ensuring the accuracy of deleting mails.

Third Embodiment

FIG. 6 illustrates a schematic flowchart of a method for displaying a mail for share according to a third embodiment of the present disclosure. This embodiment may be combined with the above-mentioned embodiments, and a method for displaying a mail for share by using a sharing box is described in detail. The explanations of terms that are the same as or corresponding to the above-mentioned embodiments are not repeated here.

Referring to FIG. 6, the method for displaying the mail for share according to this embodiment specifically includes steps S310 and S320.

In S310, a mail for share in a current mailbox is determined in response to detecting a mail sharing operation.

In S320, the mail for share is added to a sharing box for displaying.

The sharing box may be pre-created, which is a storage container configured to store target mails shared by the sharer. The sharing box may be similar to the inbox or outbox in the mailbox, as shown in FIG. 7. The display interface layout for the mails for share in the sharing box may be the same as the display interface layout for the mails in the inbox or outbox.

The sharing box is created and displayed at a preset display position in the case that there is no sharing box in the current mailbox, and the mail for share is added to the created sharing box for displaying. In the case that there is the sharing box in the current mailbox, the mail for share is added to the created sharing box for displaying.

In an embodiment, the pre-created sharing box may be displayed in real time based on the mail for share shared for the first time. In this way, the sharing box may be displayed dynamically. Therefore, the client interface is more concise. When adding a mail for share to the sharing box, the email client of the sharer or the email client of the sharee may detect whether there is a sharing box displayed on the current mailbox interface, or detect whether the mail for share is a mail shared actively for the first time or a mail which is shared by other users and received for the first time. If there is the sharing box displayed on the current mailbox interface, or if the mail for share is the mail shared actively for the first time or the mail which is shared by other users and received for the first time, the created sharing box is displayed at the preset display position (such as below a draft box) in the current mailbox, and the mail for share is added to the created sharing box for displaying. If there is no sharing box displayed on the current mailbox interface, it means that the mail for share is not the mail shared actively for the first time or the mail which is shared by other users and received for the first time. In this case, the mail for share may be directly added to the created sharing box for displaying.

In an embodiment, after actively sharing the mail, the email client of the sharer adds the mail for share to the sharing box, such that the mail for share is displayed in the sharing box. Alternatively, after receiving the mail shared by the sharer, the email client of the sharee may add the received mail for share to the sharing box, such that the mail for share may be displayed in the sharing box. In this way, the user can quickly and conveniently view all mails for share by using the sharing box, which further improves the user viewing efficiency and further improves the user experience.

Exemplarily, the mails for share added in the sharing box may be sorted sequentially based on an order in which the mails for share are added, such that the sharing box may display the mails for share based on this order. After the mail for share is added to the sharing box for displaying, a sharing success prompt identification may be displayed at a preset position of the mail for share in the sharing box to prompt the user that the mail is successfully shared, or to prompt the user that the mail for share is successfully received. In this case, the mail for share is equivalent to being in an unread state. When the user clicks on the mail for share on which the sharing success prompt identification is displayed, the email client of the user detects the mail viewing operation triggered by the user, which indicates that the sharer has viewed the mail for share, that is, the mail for share is in a read state. In this case, the displayed sharing success prompt identification may be deleted, such that the display interface is more concise.

Exemplarily, the email client of the current user may classify all the mails for share in the sharing box based on whether the mails for share in the sharing box are in the unread state or the read state, and display an unread shared mail column and a read shared mail column. In this way, users can more clearly know the mails for share currently in the unread state and the mails for share currently in the read state.

Exemplarily, the email client of the current user may move a target mail for share to display the sharing box at a top mail position, in response to detecting a top operation triggered by the current user for the target mail for share, so as to meet personalized requirements of the user With the technical solution according the embodiment of the present disclosure, the mails for share are added to the sharing box, to independently display the mails for share in the sharing box, such that the user can quickly and conveniently view all the mails for share by using the sharing box, thereby further improving user viewing efficiency and further improving the user experience.

On the basis of above-mentioned technical solutions, S320 may include: in the case that the mail for share is a mail actively shared by a current user, copying and adding the mail for share to the sharing box for displaying; or in a case that the mail for share is a received mail shared by other users, adding the received mail for share directly to the sharing box for displaying.

In an embodiment, if the mail for share is a mail actively shared by the current user, it is indicated that the mail for share is applied in the email client of the sharer, and this mail for share is a mail that actually exists in the mailbox of the sharer, such as a received mail in the inbox. In this case, the mail for share may be copied from an existing position (such as the inbox) to the sharing box, to store the mail in both the existing position and the sharing box. If the mail for share is a received mail shared by other users, it is indicated that the mail for share is applied to the email client of the sharee, and the mail for share is not a mail that actually exists in the mailbox of the sharee. In this case, the mail for share may be added and stored directly to the sharing box rather than the inbox of the sharee. All mails for share may be stored in a unified manner by using the sharing box, which is convenient for users to view in a unified manner, thereby improving the user experience.

On the basis of the above-mentioned technical solutions, S320 may further include: combining the mails for share shared in each sharing operation into a mail group, and adding the mail group to the sharing box for displaying.

The mail group may refer to a mail group formed by mails for share shared in the current sharing process, such that mails for share shared each time are stored in the same position.

In an embodiment, as shown in FIG. 7, sharing mails shared each time may be combined into a mail group. Abbreviative information on each mail group is displayed in a mail group list in the sharing box, and mail information on the mails for share in the mail group is displayed on the right side of the mail group list, such that each mail group is added to the sharing box for displaying. Since each mail group corresponds to one sharing operation, mails for share shared each time may be viewed in an intuitive and unified manner, thereby further improving viewing efficiency and user experience. Exemplarily, the number of mails for share shared each time may be displayed at a preset position of a cell where the mail group is located, so as to intuitively prompt the user the number of mails for share shared each time.

On the basis of above-mentioned each technical solution, after S320 is performed, the method may further include: in the case that the mail for share is a mail actively shared by a current user, displaying a first sharing identification at a preset position of a cell where the mail for share is located in a sharing list; or in the case that the mail for share is a received mail shared by other users, displaying a second sharing identification at a preset position of a cell where the mail for share is located in a sharing list.

The first sharing identification may be used to prompt that the mail for share is a mail actively shared by the current user. The second sharing identification may be used to prompt that the mail for share is a received shared mail shared by others. Exemplarily, the first sharing identification may be represented by a highlighted icon; and the second sharing identification may be represented by a gray scale icon.

In an embodiment, if the mail for share is the mail actively shared by the current user, the email client of the sharer may display the first sharing identification at the preset position of the cell where the mail group is located, so as to prompt the sharer that this mail is an actively shared mail. If the mail for share is the received mail shared by other users, the email client of the sharee may display the second sharing identification at the preset position of the cell where the mail group is located, so as to prompt the sharee that the mail is a received mail shared by other users. In this way, mails actively shared by the current user and mails shared by others in the sharing box may be effectively distinguished, thereby further improving the user viewing experience.

On the basis of the above-mentioned technical solutions, the method may further include: in response to detecting a shared mail deletion instruction, deleting the mail for share corresponding to the shared mail deletion instruction in the sharing box, where the shared mail deletion instruction is generated based on a sharing stop operation triggered by the sharer for at least one sharee.

In an embodiment, the sharer may trigger the sharing stop operation for all sharees, such that the clients of all sharees may receive the shared mail deletion instruction. Alternatively, the sharer may also trigger the sharing stop operation for a part of sharees, such that the part of sharees may receive the shared mail deletion instruction. For example, in the email client of the sharer, a stop button may be set on the display interface of the mail for share for controlling stop of sharing. If the sharer does not want to continue sharing mails, the sharer may perform click on the stop button to select at least one sharee for which the sharing needs to be stopped, so as to stop the mail sharing for the selected sharee. If detecting that the sharer has triggered the sharing stop operation for at least one sharee, the email client of the sharer generates the shared mail deletion instruction based on the mail to be currently stopped sharing, and sends the shared mail deletion instruction to the email clients of the targeted sharees, to delete the mails for share received by respective sharees. After receiving the shared mail deletion instruction, the email client of the sharee may delete the mail for share corresponding to the shared mail deletion instruction from the sharing box. In this way, the sharer may control mails for share in real time, which further meets user requirements.

It should be noted that, after the mail sharing ends, the sharing box in the email client of the sharer may continue to store the mail for share after the sharing ends, such that the sharer can more conveniently know the historical sharing situation. The email client of the sharer may also delete the mail for share corresponding to the shared mail deletion instruction in the sharing box, in response to detecting the shared mail deletion instruction, such that only the mail for share in the sharing state is stored in the sharing box. In this way, when the same mail is shared multiple times, it is convenient to distinguish between mails that are being shared and mails that have been shared, which makes mail management more convenient. The email client of the sharer may also display a corresponding sharing status at the preset position of each mail for share in the sharing box. Thus, the user can clearly know whether respective mails for share are in the sharing state or the shared state, thereby further improving user viewing experience.

On the basis of the above-mentioned technical solutions, the method may further include: in response to detecting that no mail for share exists in the sharing box, stopping displaying the sharing box displayed in the current mailbox.

In an embodiment, the email client of the sharer or the email client of the sharee deletes all mails for share in the sharing box in response to the shared mail deletion instruction, that is, no mail for share exists in the current sharing box. In this case, the email client of the sharer or the email client of the sharee may stop displaying the sharing box displayed in the current mailbox. To prompt the user that there is no mail for share currently. The sharing box is displayed again until the actively mails for share are detected or the mails for share are received. Therefore, the sharing box may be displayed dynamically, which makes the mailbox interface more concise, thereby further improving the user experience.

The following is an embodiment of an apparatus for displaying a mail for share according to the embodiments of the present disclosure. The apparatus and the method for displaying the mail for share according to the above-mentioned embodiments belong to the same inventive concept. For the details not described in detail in the embodiment of the apparatus for displaying the mail for share, reference may be made to the above embodiments of the method for displaying the mail for share.

Fourth Embodiment

FIG. 8 illustrates a schematic structural diagram of an apparatus for displaying a mail for share according to a fourth embodiment of the present disclosure. This embodiment may be applied to a situation in which a mail for share in the mailbox is displayed. The apparatus specifically includes: a shared mail determination module 410 and a shared mail display module 420.

The shared mail determination module 410 is configured to determine a mail for share in a current mailbox in response to detecting a mail sharing operation. The shared mail display module 420 is configured to display the mail for share in a preset display manner, where the preset display manner is different from a display manner for a non-shared mail in the current mailbox.

With the technical solutions according to the embodiments of the present disclosure, a mail for share in a current mailbox may be determined in response to detecting a mail sharing operation, and the mail for share is displayed in a preset display manner, such that the display manner for mails for share is different from that for non-shared mails in the mailbox. Therefore, mails for share and non-shared mails in the mailbox may be effectively distinguished in different display manners. In this way, the users can rapidly know the mails for share in the mailbox, thereby improving user experience.

On the basis of above-mentioned technical solutions, the shared mail determination module 410 is configured to determine a target mail to be currently shared, in response to detecting a mail sharing operation triggered by a sharer; share, based on sharee information, the target mail to a sharee corresponding to the sharee information, where the target mail is obtained by a client corresponding to the sharee; and determine the target mail as the mail for share in the current mailbox.

On the basis of above-mentioned technical solutions, the shared mail determination module 410 is configured to: receive a request for sharing a target mail, where the target mail is shared by an email client of a sharer based on a mail sharing operation triggered by the sharer; and determine the target mail indicated by the request for sharing the target mail, as the mail for share in the current mailbox.

On the basis of above-mentioned technical solutions, the apparatus further includes a mail receiving entrance shielding module.

The mail receiving entrance shielding module is configured to before a target mail shared by the email client of the sharer based on a mail sharing operation triggered by the sharer is received, shield a mail receiving entrance of a spam box, to prevent the spam box from receiving the target mail.

On the basis of above-mentioned technical solutions, the shared mail display module 420 includes a first shared mail display unit and a second shared mail display unit.

The first shared mail display unit is configured to display a preset sharing identification at a preset position of the mail for share.

The second shared mail display unit is configured to add the mail for share to a sharing box for displaying.

On the basis of above-mentioned technical solutions, the first shared mail display unit is configured to display the preset sharing identification at a preset position of a first cell in an existing mail list containing the mail for share, where the first cell is configured to display abbreviative information on the mail for share; and/or display the preset sharing identification at a preset position on a mail display interface of the mail for share.

On the basis of above-mentioned technical solutions, the second shared mail display unit is configured to in the case that the mail for share is a mail actively shared by a current user, copy and add the mail for share to the sharing box for displaying; or in the case that the mail for share is a received mail shared by other users, add the received mail for share directly to the sharing box for displaying.

On the basis of above-mentioned technical solutions, the second shared mail display unit is further configured to: combine the mails for share shared in each sharing operation into a mail group, and add the mail group to the sharing box for displaying.

On the basis of above-mentioned technical solutions, the apparatus further includes a first sharing identification display module and a second sharing identification display module.

The first sharing identification display module is configured to after the mail for share is added to the sharing box for displaying, display a first sharing identification at a preset position of a second cell in a sharing list including the mail for share, in the case that the mail for share is a mail actively shared by a current user.

The second sharing identification display module is configured to display a second sharing identification at a preset position of a second cell in a sharing list including the mail for share, in a case that the mail for share is a received mail shared by other users.

On the basis of above-mentioned technical solutions, the second cell is configured to display abbreviative information on the mail for share.

On the basis of above-mentioned technical solutions, the apparatus further includes: a first sharing identification deletion module configured to after the preset sharing identification is displayed at the preset position of the mail for share, delete the preset sharing identification displayed at the preset position of the mail for share corresponding to a shared mail deletion instruction, in response to detecting the shared mail deletion instruction, where the shared mail deletion instruction is generated based on a sharing stop operation triggered by the sharer for at least one sharee.

On the basis of above-mentioned technical solutions, the first sharing identification deletion module is further configured to in the case that the mail for share corresponding to the shared mail deletion instruction is a mail actively shared by a current user, delete the preset sharing identification displayed at the preset position of the mail for share corresponding to the shared mail deletion instruction; or in the case that the mail for share corresponding to the shared mail deletion instruction is a received mail shared by other users, delete the mail for share corresponding to the shared mail deletion instruction and the preset sharing identification displayed on the mail for share.

On the basis of above-mentioned technical solutions, the apparatus further includes: a second sharing identification deletion module configured to after the mail for share is added to the sharing box for displaying, delete the mail for share corresponding to a shared mail deletion instruction in the sharing box, in response to detecting the shared mail deletion instruction, where the shared mail deletion instruction is generated based on a sharing stop operation triggered by the sharer for at least one sharee.

On the basis of above-mentioned technical solutions, the apparatus further includes: a sharing box deletion module configured to after the mail for share is added to the sharing box for displaying, stop displaying the sharing box displayed in the mailbox, in response to detecting that no mail for share exists in the sharing box.

On the basis of above-mentioned technical solutions, the apparatus further includes: a sharing success prompt identification display module configured to display a sharing success prompt identification at a preset position of a target cell in a target mail list including the mail for share, where the target cell is configured to display abbreviative information on the mail for share.

On the basis of above-mentioned technical solutions, the apparatus further includes: a sharing success prompt identification deletion module configured to stop displaying the displayed sharing success prompt identification, in response to detecting a mail viewing operation triggered by a current user for the mail for share.

The apparatus for displaying a mail for share according to the embodiments of the present disclosure may perform the method for displaying a mail for share according to any embodiment of the present disclosure, and has corresponding functional modules and beneficial effects of executing the method for displaying a mail for share.

It should be noted that the units and modules in the embodiment of the apparatus for displaying a mail for share are only divided in accordance with the function logic, but it is not limited to the above division, as long as the corresponding functions can be realized. In addition, a name of each function unit is only intended to distinguish each other in convenience, and is not intended to limit the protection scope of the present disclosure.

Fifth Embodiment

Hereinafter, reference is made to FIG. 9, which illustrates a schematic structural diagram of an electronic device 900 (such as a terminal device or a server in FIG. 9) to which the embodiments of the present disclosure are applicable. The electronic device according to the embodiments of the present disclosure may include, but are not limited to, a mobile terminal such as a mobile phone, a laptop, a digital broadcast receiver, a PDA (personal digital assistant), a PAD (tablets), a PMP (portable multimedia player), an in-vehicle terminal (such as an in-vehicle navigation terminal) and a fixed terminal such as a digital TV, a desktop computer, and the like. The electronic device shown in FIG. 9 is only exemplary, and should not indicate any limitation to the function and scope of application of the embodiments of the present disclosure.

Figure 9:
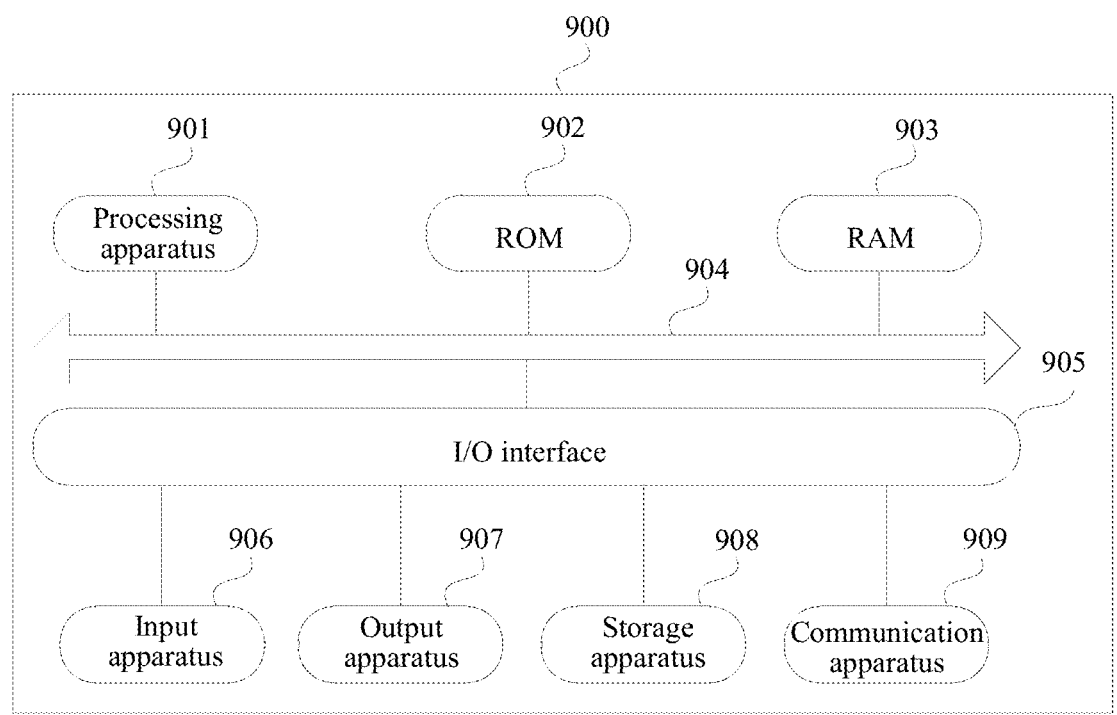
FIG. 9 illustrates a schematic structural diagram of an electronic device according to a fifth embodiment of the present disclosure.

As shown in FIG. 9, the electronic device 900 may include a processing apparatus 901, such as a central processing unit (CPU) or a graphics processor, which may execute various operations and processing based on a program stored in a read only memory (ROM) 902 or a program loaded from a storage apparatus 908 into a random access memory (RAM) 903. The RAM 903 is further configured to store various programs and data required by the electronic device 900. The processing apparatus 901, the ROM 902 and the RAM 903 are connected to each other via a bus 904. An input/output (I/O) interface 905 is also connected to the bus 904.

Generally, the I/O interface 905 may be connected to: an input apparatus 906, such as a touch screen, a touch panel, a keyboard, a mouse, a camera, a microphone, an accelerometer, and a gyroscope; an output apparatus 907, such as a liquid crystal display (LCD), a speaker, and a vibrator; a storage apparatus 908 such as a magnetic tape and a hard disk; and a communication apparatus 909. The communication apparatus 909 may enable wireless or wired communication between the electronic device 900 and other devices for data exchanging. Although FIG. 9 illustrates an electronic device 900 having various apparatuses, it should be understood that the illustrated apparatuses are not necessarily required to all be implemented or embodied. Alternatively, more or fewer devices may be implemented or included.

Specifically, according to the embodiments of the present disclosure, the process described above in conjunction with flowcharts may be implemented as a computer software program. For example, a computer program product is further provided as an embodiment in the present disclosure, including a computer program carried on a non-transitory computer readable medium. The computer program includes program codes for performing the method shown in the flowchart. In the embodiment, the computer program may be downloaded and installed from the network via the communication apparatus 909, or installed from the storage apparatus 908, or installed from the ROM 902. When the computer program is executed by the processing apparatus 901, the functions defined in the method according to the embodiment of the present disclosure are performed.

The electronic device according to the embodiments of the present disclosure and the method for displaying a mail for share according to the above-mentioned embodiments belong to the same inventive concept. For the technical details not described in detail in the embodiments of the present disclosure, reference may be made to the above-mentioned embodiments, and the embodiments of the present disclosure have the same beneficial effect as the above-mentioned embodiments.

Sixth Embodiment

A computer storage medium is provided according to an embodiment of the present disclosure. A computer program is stored on the computer storage medium. The computer program, when executed by a processor, implements the method for displaying a mail for share according to above embodiments.

It is to be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may include, but is not limited to, an electrical connection with one or more wires, a portable computer disk, a hard disk, a random access memory (RAM), a read only memory (ROM), an erasable programmable read only memory (EPROM or a flash memory), an optical fiber, a portable compact disc read only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may include a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes stored in the computer readable medium may be transmitted via any proper medium including but not limited to: a wire, an optical cable, radio frequency and the like, or any proper combination thereof.

In some embodiments, a client and a server may perform communication using any currently known or future developed network protocol such as HTTP (HyperText Transfer Protocol), and may be interconnected with any form or medium of digital data communication (for example, a communication network). The communication network embodiments include a local area network ("LAN"), a wide area network ("WAN"), the internet, an end-to-end network (for example, ad hoc end-to-end network), and any networks currently known or developed in the future.

The above computer readable medium may be incorporated in the electronic device, or may exist alone without being assembled into the electronic device.

The above computer readable medium carries one or more programs. The one or more programs, when executed by the electronic device, cause the electronic device to: determine a mail for share in a mailbox in response to detecting a mail sharing operation; and display the mail for share in a preset display manner, where the preset display manner is different from a display manner for a non-shared mail in the mailbox.

The computer program code for performing the operations disclosed in the present disclosure may be written in one or more programming languages or combinations thereof. The programming language includes, but is not limited to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including a local area network (LAN) or a wide area network (WAN). For example, the remote computer may be connected through Internet connection by an Internet service provider.

Flowcharts and block diagrams in the drawings illustrate the architecture, functions and operations that can be implemented by the system, method and computer program produce according to the embodiments of the present disclosure. Each block in a flowchart or a block diagram may represent a module, a program segment, or a part of code, and part of the module, program segment, or part of code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or operations, or may be realized by a combination of dedicated hardware and computer instructions.

The units mentioned in the description of the embodiments of the present disclosure may be implemented by means of software, or otherwise by means of hardware. In some circumstances, the name of a unit does not constitute a limitation on the unit itself. For example, an editable content display unit is also described as "an editing unit".

The functions described above in the present disclosure may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, a machine readable medium may be a tangible medium, which may contain or store a program used by the instruction execution system, apparatus, or device or a program used in combination with the instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus or device, or any proper combination thereof. The machine readable storage media, for example, includes an electrical connection based on one or more wires, a portable computer disk, a hard drive, a random access memory (RAM), a read only memory (ROM), an erasable programmable read-only memory (EPROM or flash memory), an optical fiber, a portable compact disk read only memory (CD-ROM), an optical storage device, a magnetic storage device, or any proper combination thereof.

According to one or more embodiments of the present disclosure, a method for displaying a mail for share is provided in a first example. The method includes:
  determining a mail for share in a mailbox in response to detecting a mail sharing operation;
  displaying the mail for share in a preset display manner, where the preset display manner is different from a display manner for a non-shared mail in the mailbox.

According to one or more embodiments of the present disclosure, a method for displaying a mail for share is provided in a second example 2. In the method, the determining a mail for share in a mailbox in response to detecting a mail sharing operation includes:
  determining a target mail to be currently shared, in response to detecting a mail sharing operation triggered by a sharer; and sharing, based on sharee information, the target mail to a sharee corresponding to the sharee information, where the target mail is obtained by a client corresponding to the sharee; and
  determining the target mail as the mail for share in the mailbox.

According to one or more embodiments of the present disclosure, a method for displaying a mail for share is provided in a third example 3. In the method, the determining a mail for share in a mailbox in response to detecting a mail sharing operation includes:

receiving a request for sharing a target mail, where the target mail is shared by an email client of a sharer based on a mail sharing operation triggered by the sharer; and determining the target mail indicated by the request for sharing the target mail, as the mail for share in the mailbox.

According to one or more embodiments of the present disclosure, a method for displaying a mail for share is provided in a four example. In the method, before receiving a target mail, where the target mail is shared by an email client of a sharer based on a mail sharing operation triggered by the sharer, the method further includes:

shielding a mail receiving entrance of a spam box, to prevent the spam box from receiving the target mail.

According to one or more embodiments of the present disclosure, a method for displaying a mail for share is provided in a fifth example. In the method, the displaying the mail for share in a preset display manner includes:

displaying a preset sharing identification at a preset position of the mail for share; or adding the mail for share to a sharing box for displaying.

According to one or more embodiments of the present disclosure, a method for displaying a mail for share is provided in a sixth example. In the method, the displaying a preset sharing identification at a preset position of the mail for share includes:

displaying the preset sharing identification at a preset position of a first cell in an existing mail list including the mail for share, where the first cell is configured to display abbreviative information on the mail for share; and/or displaying the preset sharing identification at a preset position on a mail display interface of the mail for share.

According to one or more embodiments of the present disclosure, a method for displaying a mail for share is provided in a seventh example. In the method, the adding the mail for share to a sharing box for displaying includes:

in a case that the mail for share is a mail actively shared by a current user, copying and adding the mail for share to the sharing box for displaying; or in a case that the mail for share is a received mail shared by other users, adding the received mail for share directly to the sharing box for displaying.

According to one or more embodiments of the present disclosure, a method for displaying a mail for share is provided in an eighth example. In the method, the adding the mail for share to a sharing box for displaying includes:

combining the mails for share shared in one sharing operation into a mail group, and adding the mail group to the sharing box for displaying.

According to one or more embodiments of the present disclosure, a method for displaying a mail for share is provided in a ninth example. In the method, after adding the mail for share to a sharing box for displaying, the method further includes:

in a case that the mail for share is a mail actively shared by a current user, displaying a first sharing identification at a preset position of a second cell in a sharing list including the mail for share; or in a case that the mail for share is a received mail shared by other users, displaying a second sharing identification at a preset position of a second cell in a sharing list including the mail for share.

According to one or more embodiments of the present disclosure, a method for displaying a mail for share is provided in a tenth example. In the method, the second cell is configured to display abbreviative information on the mail for share.

According to one or more embodiments of the present disclosure, a method for displaying a mail for share is provided in an eleventh example. In the method, after displaying a preset sharing identification at a preset position of the mail for share, the method further includes:

deleting the preset sharing identification displayed at the preset position of the mail for share corresponding to a shared mail deletion instruction, in response to detecting the shared mail deletion instruction, where the shared mail deletion instruction is generated based on a sharing stop operation triggered by a sharer for at least one sharee.

According to one or more embodiments of the present disclosure, a method for displaying a mail for share is provided in a twelfth example. In the method, the deleting the preset sharing identification displayed at the preset position of the mail for share corresponding to a shared mail deletion instruction includes:

in a case that the mail for share corresponding to the shared mail deletion instruction is a mail actively shared by a current user, deleting the preset sharing identification displayed at the preset position of the mail for share corresponding to the shared mail deletion instruction; or in a case that the mail for share corresponding to the shared mail deletion instruction is a received mail shared by other users, deleting the mail for share corresponding to the shared mail deletion instruction and the preset sharing identification displayed on the mail for share.

According to one or more embodiments of the present disclosure, a method for displaying a mail for share is provided in a thirteenth example. In the method, after adding the mail for share to a sharing box for displaying, the method further includes:

deleting the mail for share corresponding to a shared mail deletion instruction in the sharing box, in response to detecting the shared mail deletion instruction, where the shared mail deletion instruction is generated based on a sharing stop operation triggered by a sharer for at least one sharee.

According to one or more embodiments of the present disclosure, a method for displaying a mail for share is provided in a fourteenth example. In the method, after adding the mail for share to a sharing box for displaying, the method further includes:

stopping displaying the sharing box displayed in the mailbox, in response to detecting that no mail for share exists in the sharing box.

According to one or more embodiments of the present disclosure, a method for displaying a mail for share is provided in a fifteenth example. The method further includes:

displaying a sharing success prompt identification at a preset position of a target cell in a target mail list including the mail for share, where the target cell is configured to display abbreviative information on the mail for share.

According to one or more embodiments of the present disclosure, a method for displaying a mail for share is provided in a sixteenth example. The method further includes:

deleting the displayed sharing success prompt identification, in response to detecting an mail viewing operation triggered by a current user for the mail for share.

According to one or more embodiments of the present disclosure, an apparatus for displaying a mail for share is provided in in a seventeenth example. The apparatus includes:

a shared mail determination module configured to determine a mail for share in a mailbox in response to detecting a mail sharing operation; and a shared mail display module configured to display the mail for share in a preset display manner, where the preset display manner is different from a display manner for a non-shared mail in the mailbox.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

In addition, although the above operations are described in a specific order, it should not be understood that these operations are required to be performed in the specific order or performed in a sequential order. In some conditions, multitasking and parallel processing may be advantageous. Although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for displaying a mail for share, comprising:
determining a mail for share in a current mailbox, in response to detecting a mail sharing operation for a first mail group in a mailbox of a sharer, wherein mail in the mailbox of the sharer is classified in a mail group form, and the mail for share is at least one mail in the first mail group; and
displaying the mail for share in a preset display manner, wherein the preset display manner is different from a display manner for a non-shared mail in the current mailbox,
wherein the displaying the mail for share in a preset display manner comprises:
in a case that the mail for share is a mail actively shared by a current user, adding the mail for share to the sharing box for displaying; and
in a case that the mail for share is a received mail shared by other users, adding the received mail for share directly to the sharing box for displaying.

2. The method according to claim 1, wherein determining a mail for share in a current mailbox, in response to detecting a mail sharing operation for a first mail group in a mailbox of a sharer comprises:
determining a target mail to be currently shared, in response to detecting a mail sharing operation triggered by a sharer; and sharing, based on sharee information, the target mail to a sharee corresponding to the sharee information, wherein the target mail is obtained by a client corresponding to the sharee; and
determining the target mail as the mail for share in the current mailbox.

3. The method according to claim 1, wherein determining a mail for share in a current mailbox, in response to detecting a mail sharing operation for a first mail group in a mailbox of a sharer comprises:
receiving a request for sharing a target mail, wherein the target mail is shared by an email client of a sharer based on a mail sharing operation triggered by the sharer; and
determining the target mail indicated by the request for sharing the target mail, as the mail for share in the current mailbox.

4. The method according to claim 3, wherein before receiving a target mail, wherein the target mail is shared by an email client of a sharer based on a mail sharing operation triggered by the sharer, the method further comprises:
shielding a mail receiving entrance of a spam box, to prevent the spam box from receiving the target mail.

5. The method according to claim 1, wherein displaying the mail for share in a preset display manner comprises:
displaying a preset sharing identification at a preset position of the mail for share; or
adding the mail for share to a sharing box for displaying.

6. The method according to claim 5, wherein the displaying a preset sharing identification at a preset position of the mail for share comprises:
displaying the preset sharing identification at a preset position of a first cell in an existing mail list including the mail for share, wherein the first cell is configured to display abbreviative information on the mail for share; and/or
displaying the preset sharing identification at a preset position on a mail display interface of the mail for share.

7. The method according to claim 5, wherein the adding the mail for share to a sharing box for displaying comprises:
combining the mails for share shared in each sharing operation into a mail group, and adding the mail group to the sharing box for displaying.

8. The method according to claim 5, wherein after adding the mail for share to the sharing box for displaying, the method further comprises:
in a case that the mail for share is a mail actively shared by a current user, displaying a first sharing identification at a preset position of a second cell in a sharing list including the mail for share; or
in a case that the mail for share is a received mail shared by other users, displaying a second sharing identification at a preset position of a second cell in a sharing list including the mail for share.

9. The method according to claim 8, wherein the second cell is configured to display abbreviative information on the mail for share.

10. The method according to claim 5, wherein after displaying the preset sharing identification at the preset position of the mail for share, the method further comprises:
- deleting the preset sharing identification displayed at the preset position of the mail for share corresponding to a shared mail deletion instruction, in response to detecting the shared mail deletion instruction, wherein the shared mail deletion instruction is generated based on a sharing stop operation triggered by a sharer for at least one sharee.

11. The method according to claim 10, wherein the deleting the preset sharing identification displayed at the preset position of the mail for share corresponding to a shared mail deletion instruction comprises:
- in a case that the mail for share corresponding to the shared mail deletion instruction is a mail actively shared by a current user, deleting the preset sharing identification displayed at the preset position of the mail for share corresponding to the shared mail deletion instruction; or
- in a case that the mail for share corresponding to the shared mail deletion instruction is a received mail shared by other users, deleting the mail for share corresponding to the shared mail deletion instruction and the preset sharing identification displayed on the mail for share.

12. The method according to claim 5, wherein after adding the mail for share to a sharing box for displaying, the method further comprises:
- deleting the mail for share corresponding to a shared mail deletion instruction in the sharing box, in response to detecting the shared mail deletion instruction, wherein the shared mail deletion instruction is generated based on a sharing stop operation triggered by a sharer for at least one sharee.

13. The method according to claim 5, wherein after adding the mail for share to a sharing box for displaying, the method further comprises:
- stopping displaying the sharing box displayed in the current mailbox, in response to detecting that no mail for share exists in the sharing box.

14. The method of claim 1, further comprising:
- displaying a sharing success prompt identification at a preset position of a target cell in a target mail list including the mail for share, wherein the target cell is configured to display abbreviative information on the mail for share.

15. The method of claim 14, further comprising:
- stopping displaying the displayed sharing success prompt identification, in response to detecting an mail viewing operation triggered by a current user for the mail for share.

16. An electronic device, comprising:
- one or more processors;
- a memory configured to store one or more programs;
- wherein the one or more programs, when executed by the one or more processors, cause the one or more processors to:
  - determine a mail for share in a current mailbox, in response to detecting a mail sharing operation for a first mail group in a mailbox of a sharer, wherein mail in the mailbox of the sharer is classified in a mail group form, and the mail for share is at least one mail in the first mail group; and
  - display the mail for share in a preset display manner, wherein the preset display manner is different from a display manner for a non-shared mail in the current mailbox,
- wherein the one or more programs, when executed by the one or more processors, cause the one or more processors further to:
  - in a case that the mail for share is a mail actively shared by a current user, add the mail for share to the sharing box for displaying; and
  - in a case that the mail for share is a received mail shared by other users, add the received mail for share directly to the sharing box for displaying.

17. The electronic device according to claim 16, wherein the one or more programs, when executed by the one or more processors, cause the one or more processors to:
- determine a target mail to be currently shared, in response to detecting a mail sharing operation triggered by a sharer; and share, based on sharee information, the target mail to a sharee corresponding to the sharee information, wherein the target mail is obtained by a client corresponding to the sharee; and
- determine the target mail as the mail for share in the current mailbox.

18. The electronic device according to claim 16, wherein the one or more programs, when executed by the one or more processors, cause the one or more processors to:
- receive a request for sharing a target mail, wherein the target mail is shared by an email client of a sharer based on a mail sharing operation triggered by the sharer; and
- determine the target mail indicated by the request for sharing the target mail, as the mail for share in the current mailbox.

19. A non-transitory computer readable storage medium storing a computer program, wherein the computer program, when executed by a processor, causes the processor to:
- determine a mail for share in a current mailbox, in response to detecting a mail sharing operation for a first mail group in a mailbox of a sharer, wherein mail in the mailbox of the sharer is classified in a mail group form, and the mail for share is at least one mail in the first mail group; and
- display the mail for share in a preset display manner, wherein the preset display manner is different from a display manner for a non-shared mail in the current mailbox,
- wherein the computer program, when executed by a processor, causes the processor further to:
  - in a case that the mail for share is a mail actively shared by a current user, copy and add the mail for share to the sharing box for displaying; and
  - in a case that the mail for share is a received mail shared by other users, add the received mail for share directly to the sharing box for displaying.

* * * * *